United States Patent [19]
Yeh

[11] Patent Number: 5,833,062
[45] Date of Patent: Nov. 10, 1998

[54] DISK ORGANIZER

[76] Inventor: Sheng-Fu Yeh, P.O. Box 82-144, Taipei, Taiwan

[21] Appl. No.: 964,408

[22] Filed: Nov. 4, 1997

[51] Int. Cl.$^6$ .................................................... B65D 85/30
[52] U.S. Cl. .................................. 206/307.1; 206/308.1; 206/308.3; 211/40; 220/533
[58] Field of Search ............................ 206/307.1, 308.1, 206/308.3, 309, 312, 387.15, 425; 312/9.53, 9.54, 9.55, 9.56; 211/40, 41.12; 220/532, 533

[56] References Cited

U.S. PATENT DOCUMENTS

| | | | |
|---|---|---|---|
| 5,201,414 | 4/1993 | Kaszubinski | 206/309 |
| 5,253,756 | 10/1993 | Goekler | 206/307.1 |
| 5,311,993 | 5/1994 | Koch | 206/425 |
| 5,464,091 | 11/1995 | Callanhan et al. | 206/308.1 |
| 5,586,650 | 12/1996 | Yeh | 206/308.1 |
| 5,617,950 | 4/1997 | Chung | 206/308.1 |
| 5,634,563 | 6/1997 | Peng | 211/40 |

*Primary Examiner*—Paul T. Sewell
*Assistant Examiner*—Nhan T. Lam
*Attorney, Agent, or Firm*—A & J

[57] ABSTRACT

A disk organizer adapted to receive various types of disks includes a base, a cover pivotally connected to the base such that the cover is liftable from the base; and a plurality of disk clamps. Each disk clamp has a protrudent block projecting from either bottom end thereof. At least a row of clamp grooves are formed in the base. The lateral side walls of each clamp groove form multiple steps the thickness of which enlarges towards the bottom such that the space between opposite steps receives and holds the bottom angles at both ends of a disk inserted therein. Pairs of fastening recesses are formed at both sides of the base adjacent to the clamp grooves. The distance of any pair of fastening recess is identical to the distance between the protrudent blocks of the disk clamp so that the disk clamp may have the protrudent blocks thereof retained in the fastening recesses of the base and may slightly swing forwardly or rearwardly according to the positions of the fastening recesses. The disk clamp further has at least one disk retaining seat on a surface thereof. The disk retaining seat has bottom and lateral side edges which are respectively provided with holding walls for supporting and holding a disk placed in the disk retaining seat.

1 Claim, 3 Drawing Sheets

5,833,062

DISK ORGANIZER

BACKGROUND OF THE INVENTION

1. Field of the Invention

The present invention relates to an improved disk organizer.

2. Description of the Prior Art

Conventional disk storage containers are generally designed to keep only one type of disk. But there are various types of disks, including 3½" floppy disks, compact disks, ZIP disk, MO disks, etc., which have different sizes. In order to store different types of disks, users have to buy several sizes of disk storage containers. Even if the user buys a large-size disk container for storing the different types of disks he/she has, such large-size disk container does not have the necessary partitions to organize the disks into relevant sections for easy keeping.

SUMMARY OF THE INVENTION

The present invention relates to an improved disk organizer.

A primary object of the present invention is to provide a disk organizer adapted to receive different sizes of disks. The disk organizer comprises a base having formed therein at least one row of clamp grooves, each clamp groove having lateral side walls forming steps the thickness of which enlarges towards the bottom side of the groove so that the distance between opposite steps may hold disks of a different size. Therefore, 3½" floppy disks, MO disk, ZIP disk, etc. may be stored neatly in the disk organizer.

Another object of the present invention is to provide a disk organizer adapted to receive different sizes of disks. The disk organizer includes a base, a plurality of disk clamps provided on the base, at least one row of clamp grooves formed in the base, and a plurality of fastening recesses disposed at both sides of the base adjacent to the clamp grooves. The distance between any pair of fastening recesses is identical to the distance between two protrudent blocks at both ends of the bottom side of the disk clamp so that the disk clamps may be retained in the fastening recesses by means of their protrudent blocks and may slightly slant forwardly or rearwardly according to the positions of the fastening recesses. Each disk clamp is provided with at least one disk retaining seat adapted to receive a disk.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
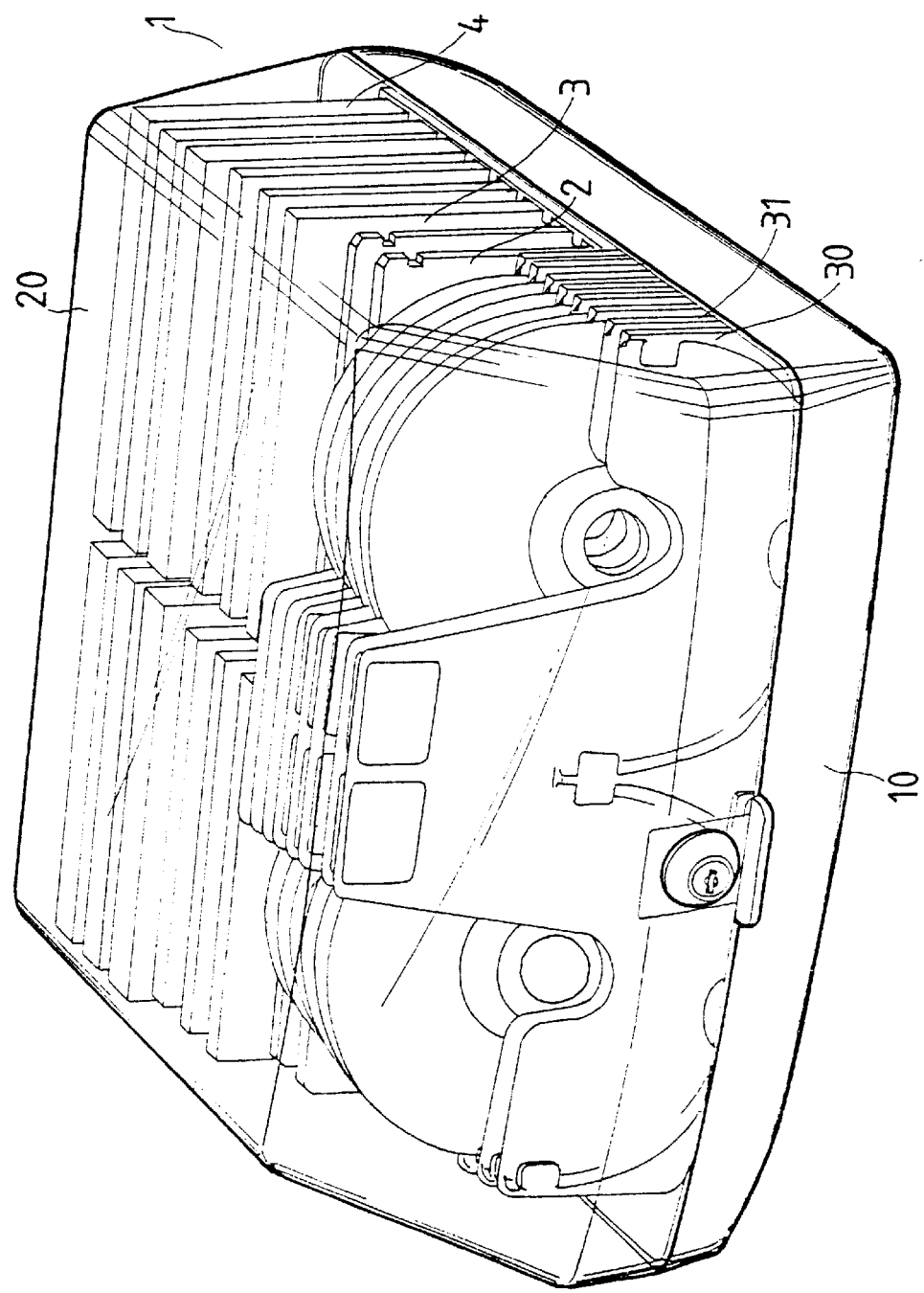
FIG. 1 is a perspective view of the disk organizer of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

FIG. 1 shows a perspective view of the disk organizer of the present invention. The present invention essentially comprises a disk holder 1 adapted to receive 3½" disks 2, MO disks 3, and ZIP disks 4. The present invention further comprises a plurality of clamping 30, 31, . . . adapted to keep cd 5 in place. The present invention is therefore adapted to store and keep disks of various types.

Figure 2:
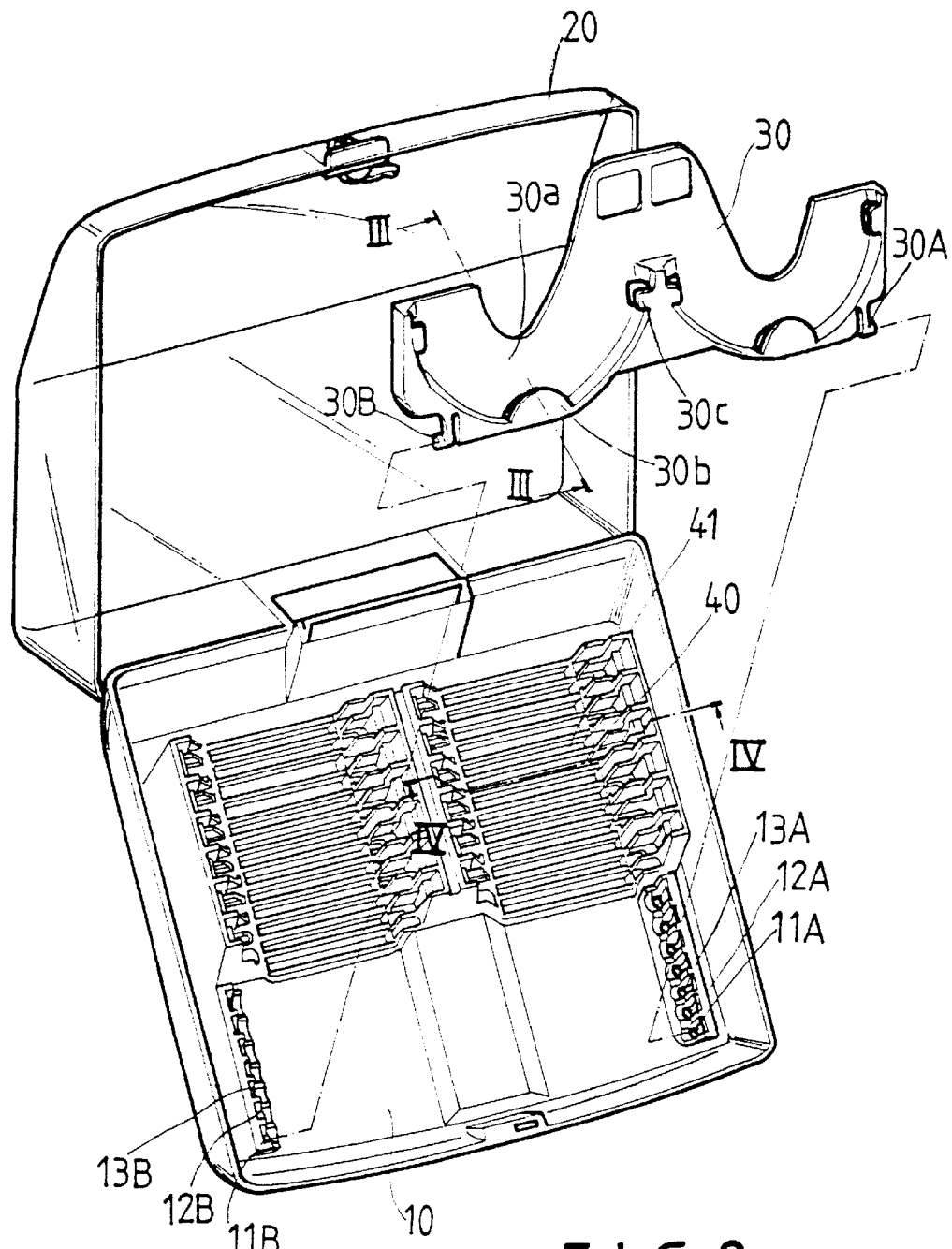
FIG. 2 is a perspective exploded view of the disk organizer of the present invention.
Figures 3, 3A:
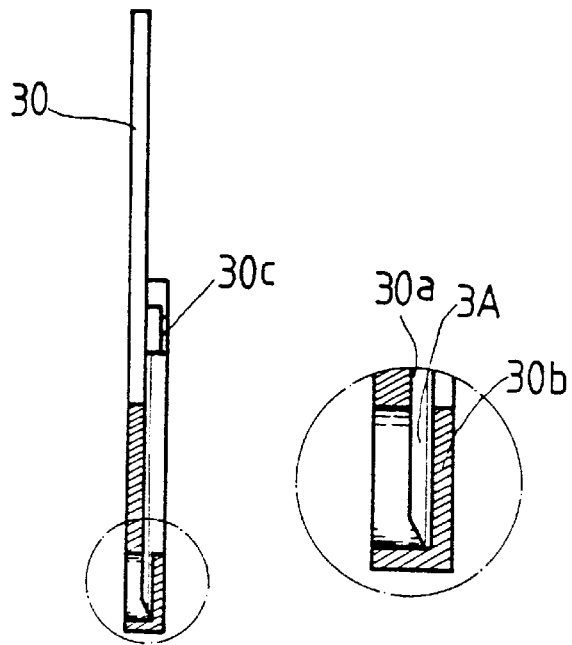
FIG. 3 is a sectional view of FIG. 1 taken along line III—III of FIG. 2.
FIG. 3A is an enlarged sectional view of FIG. 3.

FIG. 2 is a perspective exploded view illustrating the detailed structure of the present invention. The disk holder 1 comprises a base 10, a cover 30, and the above-mentioned clamps 30, 31, . . . . The clamps each has two protrudent blocks 30A, 30B projecting from either end of the bottom side thereof. The cover 20 is generally transparent to allow the user to see the contents of the disk holder 1 therethrough. The base 10 and the cover are pivotally connected at one end such that the cover 20 is liftable from the base 10. In the base 10, at least one row of clamp grooves 40, 41, . . . are integrally formed. At both sides of the base 10 adjacent to the clamp grooves 40, 41, . . . , pairs of fastening recesses 11a, 11B, 12A, 12B, 13A, 13B, . . . are correspondingly disposed. The distance between any pair of fastening recesses is the same as the distance between the protrudent blocks 30A, 30B of each clamp so that the clamps 30, 31, . . . may be held by the fastening recesses engaging the protrudent blocks 30A, 30B at both ends, and may swing slightly forwardly or rearwardly according to the position of the fastening recesses. Furthermore, the surface of each clamp is provided with a recessed disk retaining seat 30a. Referring to FIG. 3, the disk retaining seat 30a is provided with raised holding walls 30b, 30c at the bottom and side edges thereof. The holding walls 30b, 30c, and the disk retaining seat 30a together define a clearance 3A which is adapted for receiving a disk. The holding walls 30b, 30c, and the disk retaining seat 30a together keep the disk in place.

Figure 4:
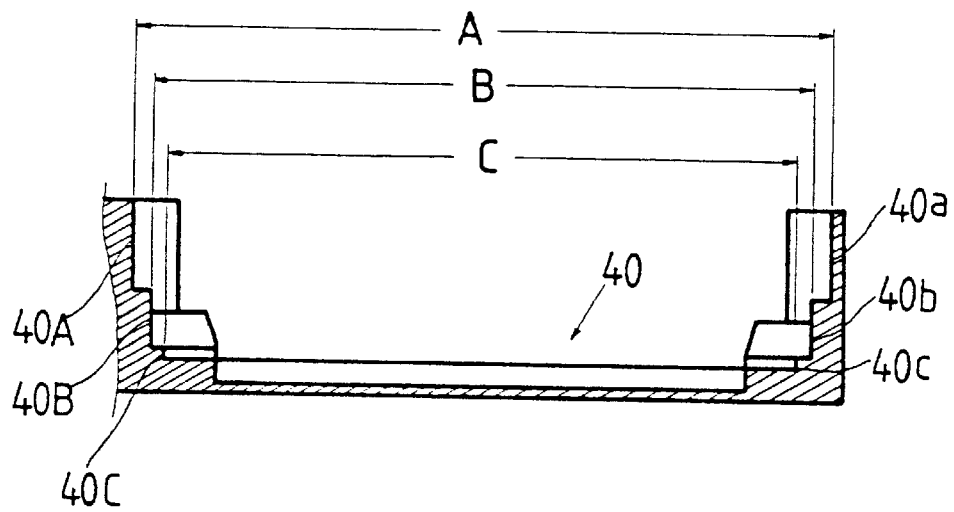
FIG. 4 is a sectional view of FIG. 1 taken along line IV—IV of FIG. 2.

Referring to FIG. 2, the clamp grooves 40, 41, . . . may clamp carriers of a specification approximating to that of the 3½" disk. With reference to FIG. 4 which illustrates the clamp groove 40, the two lateral side walls of the clamp groove 40 has a plurality of steps 40A, 40a, 40B, 40b, 40C, 40c, in which the wall thickness of the steps enlarges as they approach the bottom side of the clamp groove 40. The distance between opposite steps (i.e., between 40A and 40a, or 40B and 40b, or . . . ) may retain the bottom angles of the two ends of the corresponding disk so that the disk may be firmly held. The distance designated by A in FIG. 4 may firmly clamp the bottom angles of the two ends of a ZIP disk 4 shown in FIG. 1. The distance designated by B may firmly hold the bottom angles of the two ends of a MO disk 3 as shown in FIG. 1. The distance designated by C may firmly hold the bottom angles of the two ends of a 3½" disk as shown in FIG. 1. Therefore, it can be seen that the clamp grooves according to the present invention are adapted to receive disks of various types. The disk organizer of the invention is suitable for keeping various types of electronic data carriers and media.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A disk organizer adapted to receive various types of disks, comprising:

a base;

a cover, pivotally connected to said base such that said cover is liftable from said base; and a plurality of disk clamps, each disk clamp having a protrudent block projecting from either bottom end thereof, wherein at least a row of clamp grooves are formed in said base, the lateral side walls of each clamp groove forming multiple steps the thickness of which enlarges towards the bottom such that the space between opposite steps receives and holds the bottom angles at both ends of a disk inserted therein; pairs of fastening recesses being formed at both sides of said base adjacent to said clamp grooves, the distance of any pair of fastening recess being identical to the distance between said protrudent blocks of said disk clamp so that said disk clamp may have said protrudent blocks thereof retained in said fastening recesses of said base and may slightly swing forwardly or rearwardly according to the positions of said fastening recesses; said disk clamp further having at least one disk retaining seat on a surface thereof, said disk retaining seat having bottom and lateral side edges which are respectively provided with holding walls for supporting and holding a disk placed in said disk retaining seat.

\* \* \* \* \*